(12) United States Patent
Yamamoto et al.

(10) Patent No.: US 9,733,550 B2
(45) Date of Patent: Aug. 15, 2017

(54) LIGHTING APPARATUS CAPABLE OF SWITCHING BETWEEN TRANSMISSION AND TWO REFLECTION STATES

(71) Applicant: STANLEY ELECTRIC CO., LTD., Meguro-ku, Tokyo (JP)

(72) Inventors: Hideaki Yamamoto, Yokohama (JP); Keima Kono, Tokyo (JP); Shigehiro Yanagisawa, Isehara (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 289 days.

(21) Appl. No.: 14/693,514

(22) Filed: Apr. 22, 2015

(65) Prior Publication Data

US 2015/0338721 A1 Nov. 26, 2015

(30) Foreign Application Priority Data

May 23, 2014 (JP) .................................. 2014-106925

(51) Int. Cl.

| | |
|---|---|
| *G02F 1/15* | (2006.01) |
| *F21V 14/00* | (2006.01) |
| *G03B 15/05* | (2006.01) |
| *G02B 5/04* | (2006.01) |
| *F21V 7/04* | (2006.01) |
| *F21V 33/00* | (2006.01) |
| *G02F 1/19* | (2006.01) |
| *G02B 5/08* | (2006.01) |
| *F21W 131/40* | (2006.01) |

(52) U.S. Cl.
CPC ............... *G03B 15/05* (2013.01); *F21V 7/04* (2013.01); *F21V 14/003* (2013.01); *F21V 33/0052* (2013.01); *G02B 5/04* (2013.01); *G02B 5/08* (2013.01); *G02F 1/1506* (2013.01); *G02F 1/19* (2013.01); *F21W 2131/40* (2013.01)

(58) Field of Classification Search
CPC ........ F21V 14/003; F21V 7/04; G02F 1/0063; G02F 1/1355; G02F 1/15; G02F 1/1506; G02F 1/1508; G02F 1/153–1/15333; G02F 1/157; G02F 1/19; G02F 1/195; G02F 1/292; G02F 1/295; G02F 1/2955; G02F 1/31; G02F 1/315; G02F 2001/1536; G02F 2001/291; G02F 2201/30–2201/307; G02F 2201/346; G03B 15/03; G03B 15/06; G03B 15/05; F21S 48/17; F21S 48/1705; F21S 48/1752; G02B 5/04; G02B 5/08
USPC ........................................................ 348/370
See application file for complete search history.

(56) References Cited

U.S. PATENT DOCUMENTS 6,256,135 B1 * 7/2001 Tench .................... G02F 1/1506 359/265
6,469,683 B1 * 10/2002 Suyama ............. G02B 27/2271 345/32

FOREIGN PATENT DOCUMENTS

JP 2012181389 A 9/2012

* cited by examiner

*Primary Examiner* — Anh Mai
*Assistant Examiner* — Steven Horikoshi
(74) *Attorney, Agent, or Firm* — Holtz, Holtz & Volek PC

(57) ABSTRACT

A lighting apparatus comprising a light source which emits light with predetermined light distribution in a fixed direction, and an optical element which is arranged in such a manner that at least part of light emitted from the light source inputs to the optical element, and can perform switching to a transmission state in which the light is transmitted, a first reflection state in which the light is reflected in a first direction, and a second reflection state in which the light is reflected in a second direction different from the first direction.

8 Claims, 7 Drawing Sheets

FIB. 1B

LIGHTING APPARATUS CAPABLE OF SWITCHING BETWEEN TRANSMISSION AND TWO REFLECTION STATES

CROSS REFERENCE TO RELATED APPLICATION

This application is based on and claims priority on Japanese Patent Application 2014-106925, filed on May 23, 2014, the entire contents of which are incorporated herein by reference.

BACKGROUND OF THE INVENTION

A) Field of the Invention

This invention relates mainly to a lighting apparatus including an optical element such as an electro-deposition element. The lighting apparatus can be utilized for an auxiliary light source to take a picture brightly, for example, a strobe light attached onto a camera.

B) Description of the Related Art

A so-called electro-deposition element is disclosed, for example in

Japanese Laid-open Patent Publication 2012-181389. Here, the electro-deposition element includes mainly a pair of electrodes disposed to oppose each other, and an electrolyte layer containing silver, disposed between the pair of electrodes.

In stationary state (in the absence of applied voltage), the electrolyte layer is substantially transparent, and the electro-deposition element takes transparent state. When a voltage is applied between the pair of electrodes, electro-deposition material (silver) in the electrolyte layer precipitates/deposits on an electrode by oxidation/reduction reaction. By this phenomenon, the electro-deposition element takes mirror state.

SUMMARY

According to an aspect of this invention, there is provided a lighting apparatus comprising a light source which emits light with predetermined light distribution in a fixed direction, and an optical element which is arranged in such a manner that at least part of light emitted from the light source inputs to the optical element, and can perform switching to a transmission state in which the light is transmitted, a first reflection state in which the light is reflected in a first direction, and a second reflection state in which the light is reflected in a second direction different from the first direction.

According to another aspect of this invention, there is provided a lighting apparatus comprising a light source which emits light with predetermined light distribution in a fixed direction, a first optical element which is arranged in such a manner that at least part of light emitted from the light source inputs to the first optical element, and can perform switching to a first transmission state in which the light is transmitted, a first reflection state in which the light is reflected in a first direction, and a second reflection state in which the light is reflected in a second direction different from the first direction, and a second optical element which is arranged in such a manner that at least part of light emitted from the light source inputs to the second optical element, and can perform switching to a second transmission state in which the light is transmitted, a third reflection state in which the light is reflected in a third direction, and a fourth reflection state in which the light is reflected in a fourth direction different from the third direction.

BRIEF DESCRIPTION OF THE DRAWINGS

FIG. 1B is a perspective view which illustrates a metal mold which is used when manufacturing the electro-deposition element.

DESCRIPTION OF THE PREFERRED EMBODIMENTS

A lighting apparatus according to an embodiment includes mainly a light source, and an optical element such as an electro-deposition element (ED), for example. Here, first, the ED element which configures the lighting apparatus will be described with reference to FIGS. 1A to 3B before describing the lighting apparatus according to the embodiment.

Figure 1A:
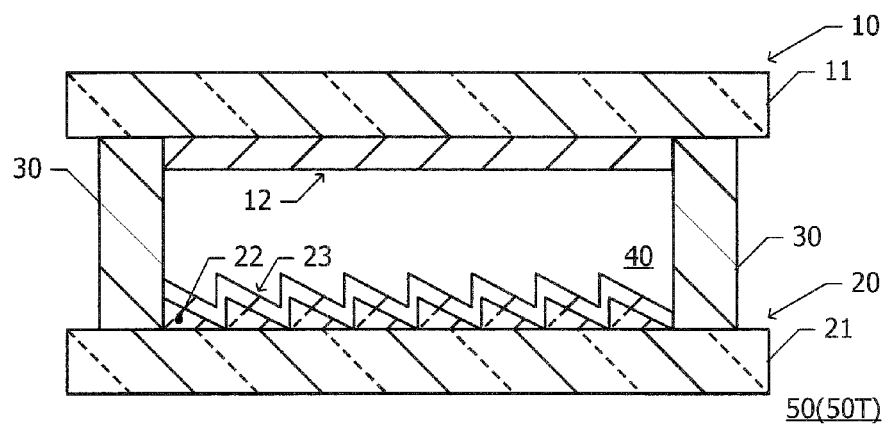
FIG. 1A is a cross-sectional view which illustrates an electro-deposition element.
Figure 1A:
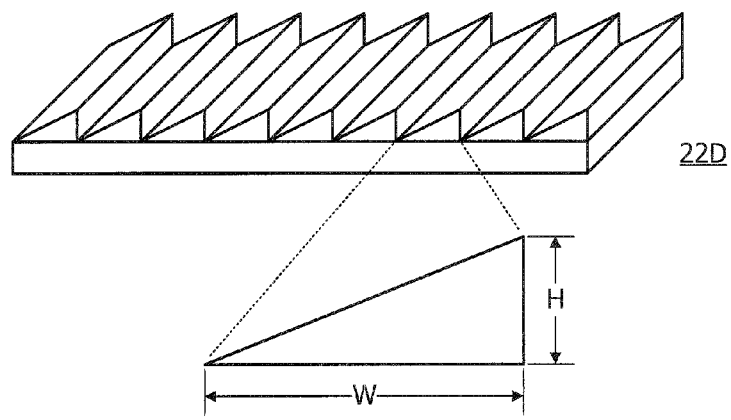

FIG. 1A is a cross-sectional view which illustrates an ED element 50 according to an embodiment. In addition, FIG. 1B is a perspective view which illustrates a metal mold 22D which is used when manufacturing the ED element 50. Hereinafter, a manufacturing method of the ED element 50 will be described with reference to FIGS. 1A and 1B.

First, a flat substrate 10 is manufactured. The flat substrate 10 can be manufactured by forming a planar transparent electrode 12 on the surface of a planar transparent substrate 11 using, for example, a sputtering method, a vacuum deposition method, or the like. A glass substrate, a film substrate, or the like, with light transmittance is used in the transparent substrate 11. In addition, indium tin oxide (ITO), indium zinc oxide (IZO), or the like, with light transmittance and conductivity is used in the transparent electrode 12.

Subsequently, a prism substrate 20 is manufactured. A prism layer 22 is formed on the surface of a planar transparent substrate 21. The metal mold 22D as illustrated in FIG. 1B is used, for example, when forming the prism layer 22. In addition, a glass substrate, a film substrate, or the like, with light transmittance is used in the transparent substrate 21.

As illustrated in FIG. 1B, the entire shape of the metal mold 22D is a plate shape, and a plurality of triangular prismatic structures which stand in line in one direction are provided on the surface of the metal mold. Each cross section of the triangular prismatic structures is configured of a right-angled triangle (vertical angle is 75°, and base angles are 15° and 90°) of which a height H is 5 μm, and a width W is 20 μm, for example.

An ultraviolet curable resin, for example acrylic resin, is applied to the surface of the transparent substrate 21, and patterns of the triangular prismatic structures are transferred to the resin by pressing the metal mold 22D. In addition, the resin is irradiated with ultraviolet light from the rear surface of the transparent substrate 21, and the resin is cured. In this manner, prisms (prism layer 22) corresponding to the triangular prismatic structures of the metal mold 22D is formed on the surface of the transparent substrate 21.

Subsequently, the transparent electrode 23 is formed on the surface of the prism layer 22. The transparent electrode 23 has a shape corresponding to unevenness of the prism layer 22. The transparent electrode 23 can be formed using, for example, a sputtering method, a vacuum deposition method, or the like. For example, ITO, IZO, or the like, is used in the transparent electrode 23.

In this manner, the prism substrate 20 is completed.

Subsequently, gap control agents, each diameter of which is tens of μm to hundreds of μm, for example 500 μm, are spread on the surface (transparent electrode side) of any one of the flat substrate 10 and the prism substrate 20. A density of the gap control agents is, for example, approximately 1 to 3/mm$^2$. In addition, columnar protrusion structures (spacers) may be formed instead of spreading the gap control agents.

Subsequently, a sealing frame member 30 having a rectangular frame shape entirely in a planar view is formed on the surface (transparent electrode side) of any one of the flat substrate 10 and the prism substrate 20. An ultraviolet curable resin, for example, is used in the sealing frame member 30. In addition, it is also possible to use a heat curable resin in the sealing frame member 30.

Subsequently, electrolytic solution including an ED material containing silver is dropped inside the sealing frame member 30 which is formed on the surface of the substrate. In addition, the flat substrate 10 and the prism substrate 20 are bonded in such a manner that the transparent electrodes 12 and 22 face each other. In this manner, electrolytic solution (electrolyte layer) 40 is sealed between the flat substrate 10 and the prism substrate 20. Thereafter, the sealing frame member 30 is irradiated with ultraviolet light, and the sealing frame member 30 is cured.

The electrolytic solution 40 is configured of, for example, an ED material (AgNO$_3$, or the like), an electrolyte (TBABr, or the like), a mediator (CuCl$_2$, or the like), a support electrolyte (LiBr, or the like), a solvent (DMSO: dimethylsulfoxide, or the like), or the like. In addition, the electrolytic solution may be set to a gel (jelly) state by adding a polymer for gelation (PVB: polyvinyl-butyral, or the like). In the electrolytic solution 40 of the embodiment, AgNO$_3$ of 50 mM as the ED material, LiBr of 250 mM as the support electrolyte, CuCl$_2$ of 10 mM as the mediator, and PVB of 10 wt % as the polymer for gelation are added in the solvent of DMSO.

In the ED material, it is possible to use, for example, AgClO$_4$, AgBr, or the like, containing silver, in addition to AgNO$_3$. Here, the ED material is a material of which a part is precipitated/deposited or disappears due to an oxidation-reduction reaction on the surface of the transparent electrodes 12 and 23.

The support electrolyte may be a material which promotes the oxidation-reduction reaction of the ED material. For example, it is possible to preferably use lithium salt (LiCl, LiBr, LiI, LiBF$_4$, LiClO$_4$, or the like), potassium salt (KCl, KBr, KI, or the like), and sodium salt (NaCl, NaBr, NaI, or the like).

In the mediator, for example, it is possible to use CuSO$_4$, CuBr$_2$, or the like, including copper, in addition to CuCl$_2$. Here, the mediator is a material which is subjected to oxidatation-reduction using energy which is electrochemically lower than silver.

The solvent may be a material which can stably holds the ED material, or the like. For example, it is possible to use a polar solvent such as water or propylene carbonate, an organic solvent with no polarity, ionic liquid, an ionic conductive polymer, a polyelectrolyte, or the like. Specifically, it is possible to preferably use propylene carbonate, N,N-dimethylformamide, tetrahydrofuran, acetonytril, polyvinyl sulfate, polystyrene sulfonic acid, polyacrylic acid, or the like, in addition to DMSO.

In addition, when dropping the electrolytic solution, it is possible to use a dispenser, an ink jet head, or the like. In addition, when bonding the flat substrate 10 and the prism substrate 20, the bonding can be performed in the atmosphere, in a vacuum, or in a nitrogen atmosphere.

In this manner, the ED element 50 is completed.

Figure 1C:
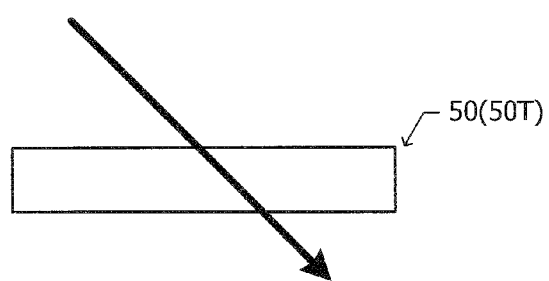
FIG. 1C is a schematic diagram which illustrates an optical function of the electro-deposition element in stationary state (in the absence of applied voltage).

FIG. 1C is a schematic diagram which illustrates an optical function of the ED element 50 in the absence of applied voltage. Then, the electrolyte layer 40 (refer to FIG. 1A) is mostly transparent, and the ED element 50 realizes a light transmission state. In addition, hereinafter, there is a case in which the ED element 50 in the light transmission state is denoted by an ED element 50T. When inputting a light beam to the ED element 50T, the light beam penetrates the ED element 50T.

Figure 2A:
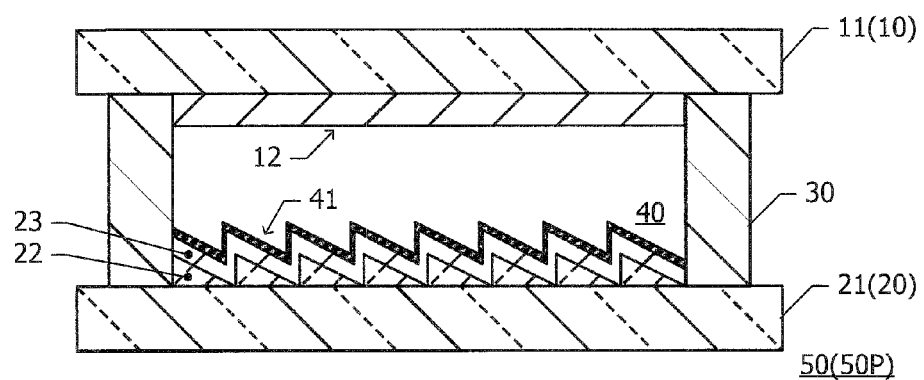
FIGS. 2A and 2B are cross-sectional views which illustrate the electro-deposition element in a first light reflection state, and a schematic diagram which illustrates an optical function thereof.
Figure 2B:
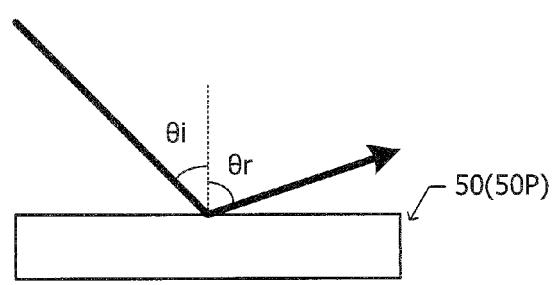

FIG. 2A is a cross-sectional view which illustrates the ED element 50 when a negative dc potential is applied to the transparent electrode 23 of the prism substrate 20 in a case in which a potential of the transparent electrode 12 of the flat substrate 10 is set to a reference, and FIG. 2B is a schematic diagram which illustrates an optical function of the ED element 50.

As illustrated in FIG. 2A, when a voltage of approximately −2.5 V, for example, is applied to the transparent electrode 23 with respect to the transparent electrode 12, silver ions (ED material) in the electrolyte layer 40 are reduced on the surface of the transparent electrode 23, and a thin silver film (highly reflective film) 41 is precipitated. In this manner, the ED element 50 realizes a first light reflection state. Hereinafter, there is a case in which the ED element 50 in the first light reflection state is denoted by an ED element 50P.

In addition, when applying of a voltage to the transparent electrode 23 is stopped, the silver (thin film) which is precipitated on the surface of the transparent electrode 23 is melted as silver ions in the electrolyte layer 40, and is lost from the surface of the transparent electrode 23. In this manner the ED element 50 realizes the light transmission state again.

As illustrated in FIG. 2B, when inputting a light beam to the ED element 50P, the light beam is reflected in the first direction due to the surface of the thin silver film 41 based on an inclined face of the prism layer 22 (or transparent electrode 23). In conditions in the embodiment, when setting an angle of incidence θi to 45 degrees, an angle of reflection θr becomes approximately 75 degrees.

Figure 3A:
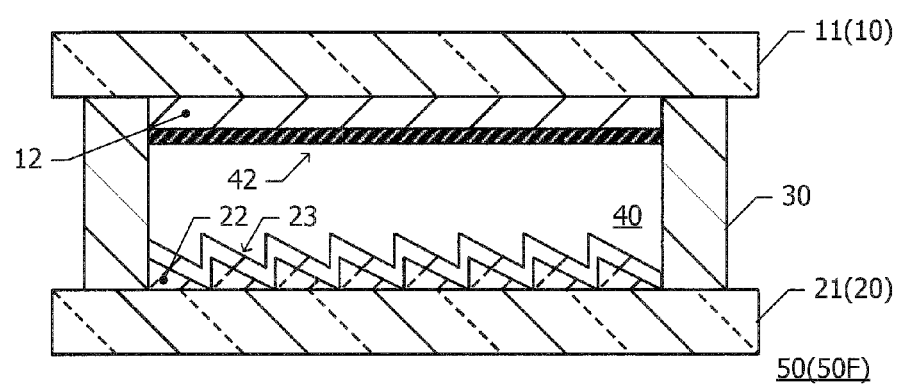
FIGS. 3A and 3B are cross-sectional views which illustrate the electro-deposition element in a second light reflection state, and a schematic diagram which illustrates an optical function thereof.
Figure 3B:
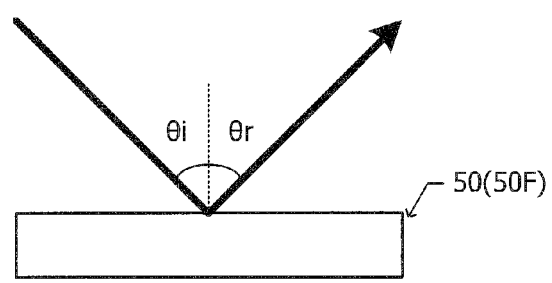

FIG. 3A is a cross-sectional view which illustrates the ED element 50 when a negative dc potential is applied to the transparent electrode 12 of the flat substrate 10 in a case in which the potential of the transparent electrode 23 of the prism substrate 20 is set to a reference, and FIG. 3B is a schematic diagram which illustrates an optical function of the ED element 50.

As illustrated in FIG. 3A, when a voltage of approximately −2.5 V, for example, is applied to the transparent electrode 12 with respect to the transparent electrode 23, a thin silver film (highly reflective film) 42 is precipitated on the surface of the transparent electrode 12. In this manner, the ED element 50 realizes a second light reflection state. Hereinafter, there is a case in which the ED element 50 in the second light reflection state is denoted by an ED element 50F.

In addition, when applying of a voltage to the transparent electrode 12 is stopped, the silver (thin film) which is precipitated on the surface of the transparent electrode 12 is lost from the surface of the transparent electrode 12. In this manner, the ED element 50 realizes the light transmission state again.

As illustrated in FIG. 3B, when inputting a light beam to the ED element 50F, the light beam is reflected in the second direction due to the surface of the thin silver film 42 based on a planar face of the transparent electrode 12. In conditions of the embodiment, when setting an angle of incidence θi to 45 degrees, for example, an angle of reflection θr becomes approximately 45 degrees, and the angle of incidence and the angle of reflection become the same.

Hitherto, the ED element 50 has been described. Hereinafter, a lighting apparatus in which the ED element 50 is used will be described with reference to FIGS. 4A to 6.

Figure 4A:
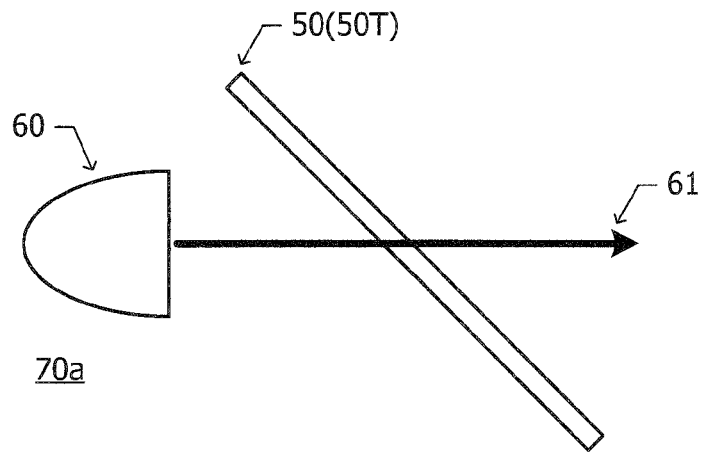
FIGS. 4A to 4C are schematic diagrams which illustrate a lighting apparatus according to a first embodiment.
Figure 4B:
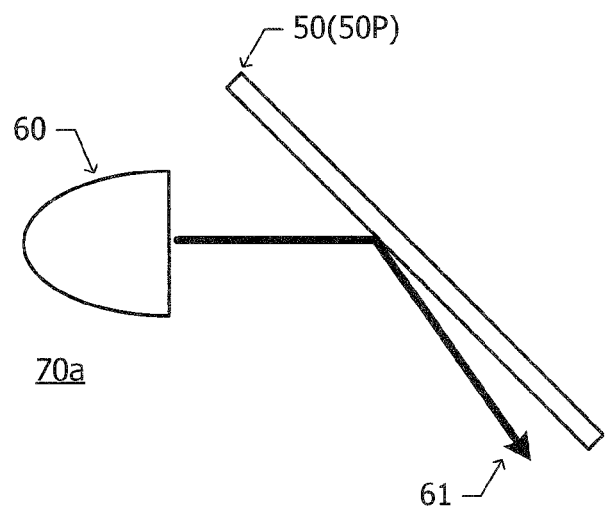
Figure 4C:
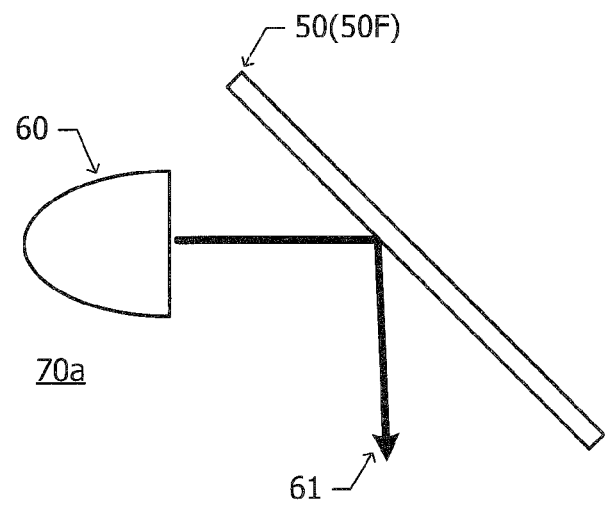

FIGS. 4A to 4C are schematic diagrams which illustrate a lighting apparatus 70a according to a first embodiment. The lighting apparatus 70a includes a light source 60, and a single ED element 50.

The light source 60 is configured of, for example, a light emitting source such as a semiconductor light emitting element (LED), a fluorescent light, a lamp (xenon, halogen, sodium, or the like), and a light reflection plate (mirror) which surrounds the light emitting source. The light source 60 emits light with a predetermined distribution from a light output face in a fixed direction. Here, a light beam which corresponds to an optical axis of the light source 60 is denoted by a light beam 61 with respect to the light which is emitted from the light source 60.

The ED element 50 is arranged so that, for example, the flat substrate 10 (refer to FIG. 1A) and the light source 60 face each other on the optical axis of the light source 60. In addition, the ED element is arranged by being inclined to the optical axis of the light source 60.

When the ED element 50 is in the light transmission state (ED element 50T), as illustrated in FIG. 4A, light which is emitted from the light source 60 (for example, light beam 61) goes straight by penetrating the ED element 50. In addition, when the ED element 50 which is applied with a voltage is set to the first light reflection state (ED element 50P), as illustrated in FIG. 4B, the light which is emitted from the light source 60 (for example, light beam 61) is reflected in the first direction due to the ED element 50. In addition, when the ED element 50 which is applied with a voltage is set to a second light reflection state (ED element 50F), as illustrated in FIG. 4C, light which is emitted from the light source 60 (for example, light beam 61) is reflected in the second direction which is different from the first direction due to the ED element 50.

In this manner, it is possible to switch a direction of light which is emitted from the light source 60 to at least three directions by switching the ED element 50 to the light transmission state (ED element 50T), the first light reflection state (ED element 50P), and the second light reflection state (ED element 50F) using an electrical control. In addition, there is no problem when adopting a configuration in which a direction of light which is emitted from the light source 60 is switched to multiple directions by controlling an inclining angle of the ED element with respect to the optical axis.

Figure 5A:
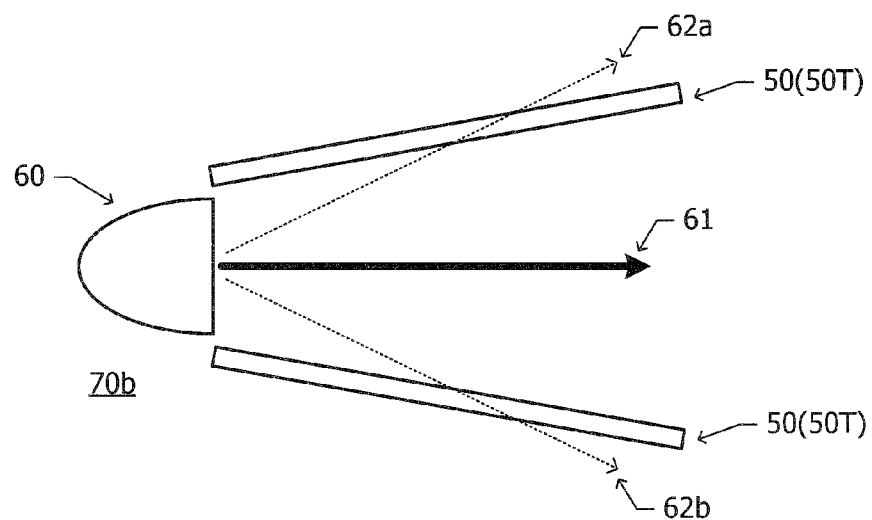
FIGS. 5A to 5C are schematic diagrams which illustrate a lighting apparatus according to a second embodiment.
Figure 5B:
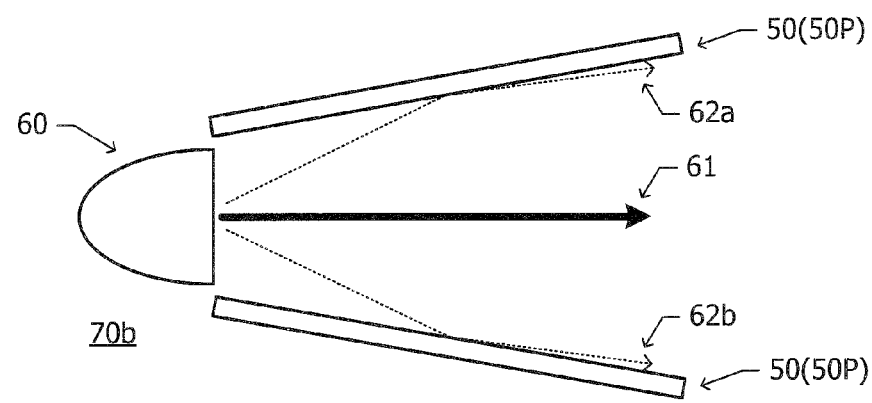
Figure 5C:
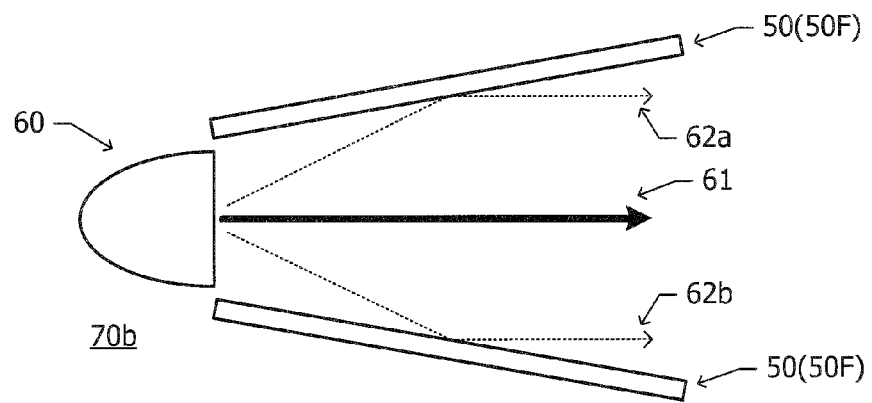

FIGS. 5A to 5C are schematic diagrams which illustrate a lighting apparatus 70b according to a second embodiment. The lighting apparatus 70b includes a light source 60, and two ED elements 50.

The light source 60 emits light with predetermined light distribution from a light output face in a fixed direction. Here, a light beam which corresponds to the optical axis of the light source 60 is denoted by the light beam 61 with respect to the light which is emitted from the light source 60. In addition, light beams which correspond to end regions of light with predetermined light distribution (spreading of light) are denoted by light beams 62a and 62b.

The two ED elements 50 are arranged by interposing the optical axis of the light source 60 therebetween on the light output face side, and are arranged so that the flat substrates 10 (refer to FIG. 1A) face each other, for example. In addition, the ED elements are arranged by being inclined to the optical axis of the light source 60, respectively.

When the two ED elements 50 are in the light transmission state (ED element 50T) together, as illustrated in FIG. 5A, light beams which are emitted from the light source 60 (for example, light beams 62a and 62b) penetrate the two ED elements 50. In this case, light emitted from the light source 60 is propagated with a light distribution property (for example, wide angle light distribution) which is caused by a configuration of the light source 60.

In addition, when both the two ED elements 50 are set to the first light reflection state (ED element 50P) by applying a voltage, as illustrated in FIG. 5B, light beams which are emitted from the light source 60 (for example, light beams 62a and 62b) are reflected by the two ED elements 50. In this case, the light which is emitted from the light source 60 is propagated with a light distribution property (for example, middle angle light distribution) which is relatively narrower than the light distribution property which is caused by the configuration of the light source 60.

In addition, when both the two ED elements 50 which are applied with a voltage are set to the second light reflection state (ED element 50F), as illustrated in FIG. 5C, light beams which are emitted from the light source 60 (for example, light beams 62a and 62b) are reflected due to the two ED elements 50. In this case, the light which is emitted from the light source 60 is propagated with a light distribution property (for example, narrow angle light distribution) which is further narrower (relatively) than the light distribution property which is caused by the configuration of the light source 60.

In this manner, it is possible to switch a light distribution state of light emitted from the light source 60 to at least three different states by switching the two ED elements 50 to the light transmission state (ED element 50T), the first light reflection state (ED element 50P), and the second light reflection state (ED element 50F) using an electrical control. In addition, there is no problem when light is propagated in a light distribution state which is relatively wide in only one direction, by setting one ED element to the light transmission state, and the other ED element to the first or second light reflection state.

Figure 6:
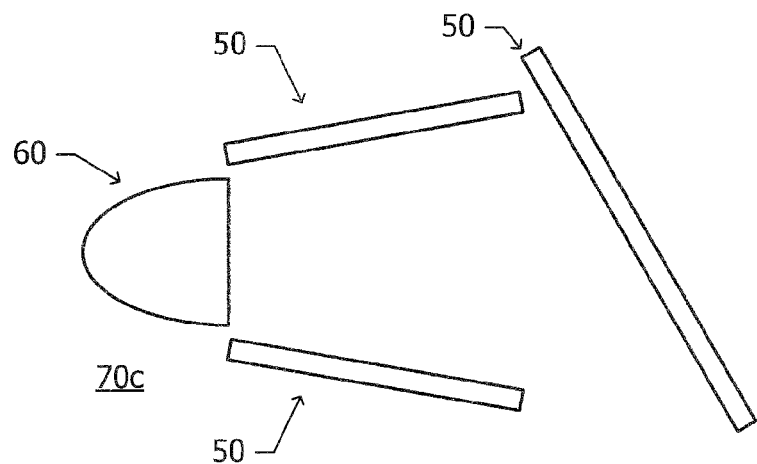
FIG. 6 is a schematic diagram which illustrates a lighting apparatus according to a third embodiment.

FIG. 6 is a schematic diagram which illustrates a lighting apparatus 70c according to a third embodiment. The lighting apparatus 70c includes a light source 60, and three ED elements 50, and has a configuration in which the lighting apparatuses 70a and 70b according to the first and second embodiments are combined. By adopting such a configuration, it is possible to switch directions of light which is emitted from the light source 60 to at least three directions, and to switch light distribution states of light which is emitted from the light source 60 to at least three different states.

Figure 7:
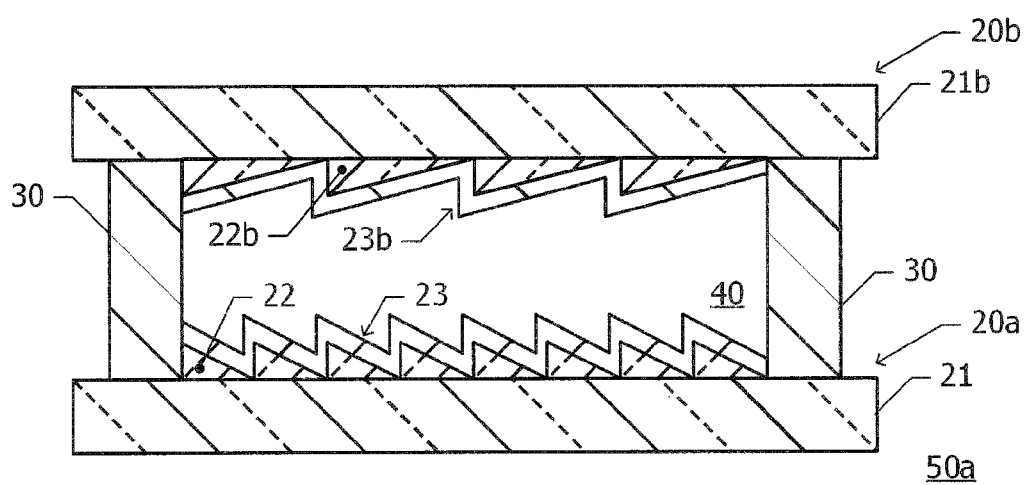
FIG. 7 is a cross-sectional view which illustrates a modification of the electro-deposition element according to the embodiment.

FIG. 7 is a cross-sectional view which illustrates a modification of the ED element 50. In the ED element 50, there is no problem when the flat substrate 10 is replaced by a prism substrate which includes a prism of which a shape is different from the prism (prism layer 22) of the prism substrate 20.

An ED element 50a according to the modification has a configuration in which an electrolyte layer 40 is arranged between first and second prism substrates 20a and 20b which are arranged so as to face each other. The first prism substrate 20a has the same configuration as that of the prism substrate 20 in the ED element 50. In addition, the second prism substrate 20b has approximately the same configuration as that of the first prism substrate 20a except for the prism layer 22b.

The prism in the second prism substrate 20b has a triangular prismatic shape which extends in one direction, and has a shape which is different from the prism in the first prism substrate 20a. In addition, there is no problem, for example, when a prism layer 22b of the second prism substrate 20b has a configuration in which a first-type prism in a predetermined shape, and a second-type prism which has a shape different from that of the first-type prism are mixed.

There is no problem when the ED element 50a according to such a modification is used instead of the ED element 50, in the lighting apparatuses 70a to 70c according to the first to third embodiments.

Figure 8A:
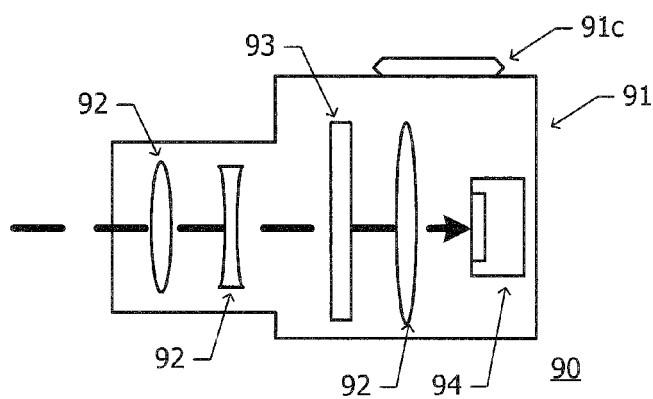
FIGS. 8A to 8C are schematic diagrams which illustrate an application of the lighting apparatus according to the embodiment.
Figure 8B:
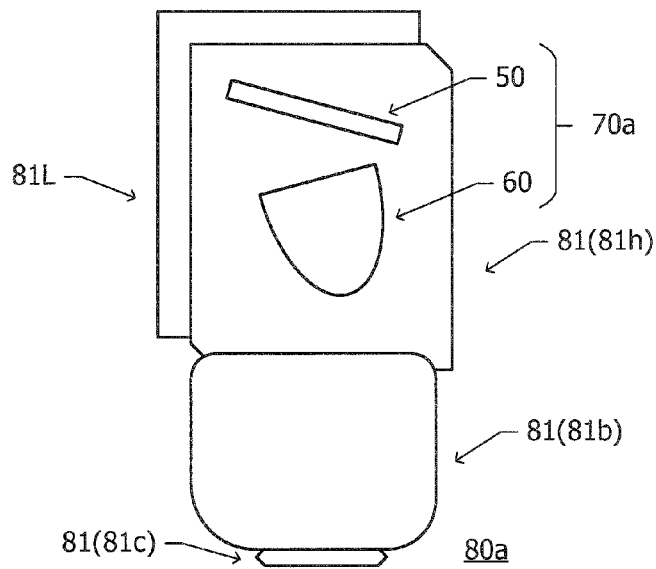
Figure 8C:
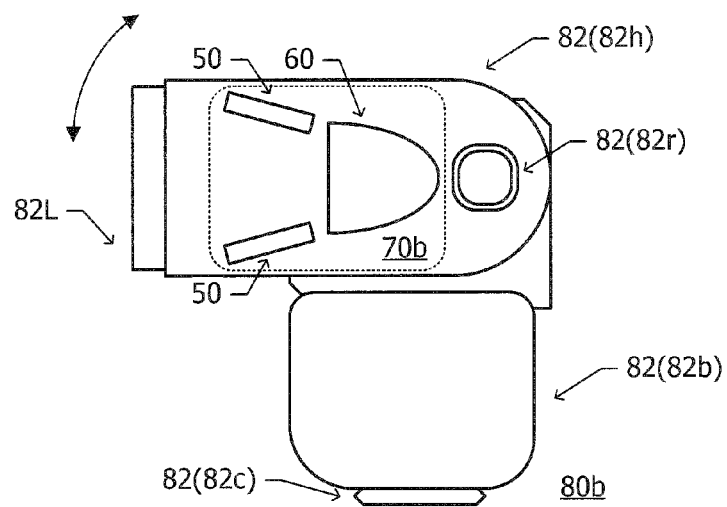

FIGS. 8A to 8C are schematic diagrams which illustrate applications of lighting apparatuses according to the embodiments. The lighting apparatus according to the examples can be applied to, for example, an auxiliary light source (stroboscope) for photographing, or the like.

FIG. 8A illustrates a constructional example of an imaging apparatus 90. In general, the imaging apparatus 90 has a configuration in which an optical lens 92, a mechanical shutter 93, an imaging element 94, and the like, are combined in the inside of a housing 91. A connection unit 91c on which the stroboscope can be mounted is provided on a top face of the housing 91.

FIG. 8B illustrates a stroboscope 80a in which the lighting apparatus 70a according to the first embodiment is used. The stroboscope 80a is configured of the lighting apparatus 70a, and a housing 81 which supports the lighting apparatus 70a.

The housing 81 includes a head unit 81h and a base unit 81b, and the lighting apparatus 70a is combined in the head unit 81h. An optical lens (light transmitting resin) 81L is provided on a top face and a side face of the head unit 81h, and light which is emitted from the lighting apparatus 70a is output to the outside through the optical lens 81L. The base unit 81b is mechanically combined with the head unit 81h, and a connection unit 81c which is connected to the connection unit 91c of the imaging apparatus 90 is provided on a base portion thereof.

A case in which a specific object is photographed by attaching the stroboscope 80a to the imaging apparatus 90 will be assumed.

When the ED element 50 is set to the second light reflection state, for example, using an electrical control, light emitted from the light source 60 is emitted from a side face of the head unit 81h. At this time, it is possible to photograph light which is output from the head unit 81h while irradiating an object with the light directly.

In addition, when the ED element 50 is set to the light transmission state or the first light reflection state, light which is emitted from the light source 60 is output from the top face (or upper part of side face) of the head unit 81h. At this time, it is possible to photograph the light which is output from the head unit 81h while indirectly irradiating an object with the light by causing the light to be reflected on a ceiling, or the like (in general, referred to as bounce photographing).

In general, a stroboscope in the related art includes a mechanism of which a head unit can rotate with respect to a base unit. When switching photographing using direct light to bounce photographing, a light output direction is adjusted by mechanically rotating the head unit of the stroboscope, or the like (for example, Japanese Patent Application No. 2006-171192, and Japanese Patent Application No. 2009-265233).

Meanwhile, in the stroboscope in which the lighting apparatus according to the first embodiment is used, it is possible to adjust a light output direction using an electrical control, and it is not necessary to provide a mechanism unit for rotating a head unit. For this reason, it is possible to obtain a dominant effect compared to a stroboscope in the related art, when reducing the number of components of the stroboscope, or when performing minimizing, weight saving, or the like, of the stroboscope.

FIG. 8C illustrates a stroboscope 80b in which the lighting apparatus 70b according to the second embodiment is used. The stroboscope 80b is configured of the lighting apparatus 70b, and a housing 82 which supports the lighting apparatus 70b.

The housing 82 includes a head unit 82h and a base unit 82b, and the lighting apparatus 70b is incorporated in the head unit 82h. An optical lens (light transmitting resin) 82L is provided on one side face of the head unit 82h, light which is emitted from the lighting apparatus 70b is output to the outside through the optical lens 82L. The base unit 82b is mechanically combined with the head unit 82h, and a connection unit 82c which is connected to the connection unit 91c of the imaging apparatus 90 is provided on a base portion thereof. In addition, the head unit 82h may include a rotation mechanism 82r so as to rotate in the arrow direction which is illustrated in the figure.

A case in which the stroboscope 80b is attached to the imaging apparatus 90, and a specific object is photographed will be assumed.

When the two ED elements 50 are set to a light transmission state, for example, light which is emitted from the light source 60 is output from a side face of the head unit 81h in a light distribution state which is relatively wide (wide angle light distribution). At this time, it is possible to photograph light which is output from the head unit 81h while irradiating an object and the periphery thereof with the light.

In addition, when the two ED elements 50 are set to, for example, the first light reflection state or the second light reflection state using an electrical control, light which is emitted from the light source 60 is output from the side face of the head unit 81h in a light distribution state which is relatively narrow (middle angle light distribution, or narrow angle light distribution). At this time, it is possible to photograph the light which is output from the head unit 81*h* while intensively irradiating an object with the light.

In general, a stroboscope in the related art includes a mechanism which can move an optical lens on a light output face, or a light source. When a lighting state of an object and the periphery thereof is changed, a light distribution state of output light is adjusted by mechanically moving a light source or an optical lens, changing a distance between the light source and the optical lens, or the like.

Meanwhile, in the stroboscope in which the lighting apparatus according to the second embodiment is used, it is possible to adjust a light distribution state of output light using an electrical control, and it is not necessary to provide a mechanism element for moving a light source. For this reason, it is possible to obtain a dominant effect compared to a stroboscope in the related art, when reducing the number of components of the stroboscope, and when performing minimizing, weight saving, or the like, of the stroboscope.

In addition, the application of the lighting apparatus according to the embodiment is not limited to the stroboscope. Since the lighting apparatus according to the embodiment obtains a dominant effect in minimizing and weight saving, it is also possible to preferably apply the lighting apparatus to an auxiliary light source, or the like, of a product in which minimizing and weight saving is required such as a camera for a mobile phone, and an endoscope camera, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What are claimed are:

1. A lighting apparatus comprising:
   a light source which emits light with a predetermined light distribution in a fixed direction; and
   an optical element which is arranged in such a manner that at least part of the light emitted from the light source is input to the optical element, and can perform switching to a transmission state in which the light is transmitted, a first reflection state in which the light is reflected in a first direction, and a second reflection state in which the light is reflected in a second direction different from the first direction,
   wherein the optical element includes:
   first and second transparent substrates which are arranged so as to face each other,
   a first prism layer which is provided on a surface, on a near side to the second transparent substrate, of the first transparent substrate,
   a first transparent electrode film which is provided on a surface of the prism layer,
   a second transparent electrode film which is provided on a surface, on a near side to the first transparent substrate, of the second transparent substrate, and
   an electrolyte layer which is arranged between the first and second transparent electrode films, and includes an electro-deposition material containing silver, and
   wherein the optical element is arranged in such a manner that the light emitted from the light source is input to and inclines to the first or second transparent substrate.

2. The lighting apparatus according to claim 1, wherein the optical element further includes a second prism layer which is provided between the second transparent substrate and the second transparent electrode film.

3. The lighting apparatus according to claim 1, further comprising:
   a housing which supports the light source and the optical element, and includes a connection mechanism so as to be attached to an imaging apparatus.

4. A lighting apparatus comprising:
   a light source which emits light with a predetermined light distribution in a fixed direction;
   a first optical element which is arranged in such a manner that at least part of the light emitted from the light source is input to the first optical element, and can perform switching to a first transmission state in which the light is transmitted, a first reflection state in which the light is reflected in a first direction, and a second reflection state in which the light is reflected in a second direction different from the first direction; and
   a second optical element which is arranged in such a manner that at least part of the light emitted from the light source is input to the second optical element, and can perform switching to a second transmission state in which the light is transmitted, a third reflection state in which the light is reflected in a third direction, and a fourth reflection state in which the light is reflected in a fourth direction different from the third direction,
   wherein the first and second optical elements are arranged so as to face each other, an optical axis of the light source passing between the first and second optical elements.

5. The lighting apparatus according to claim 4,
   wherein each of the first and second optical elements includes:
   first and second transparent substrates which are arranged so as to face each other,
   a first prism layer which is provided on a surface, on a near side to the second transparent substrate, of the first transparent substrate,
   a first transparent electrode film which is provided on a surface of the prism layer,
   a second transparent electrode film which is provided on a surface, on a near side to the first transparent substrate, of the second transparent substrate, and
   an electrolyte layer which is arranged between the first and second transparent electrode films, and includes an electro-deposition material containing silver, and
   wherein each of the first and second optical elements is arranged in such a manner that the light emitted from the light source is input to and inclines to the first or second transparent substrate.

6. The lighting apparatus according to claim 5, wherein each of the first and second optical elements further includes a second prism layer which is provided between the second transparent substrate and the second transparent electrode film.

7. The lighting apparatus according to claim 4, further comprising:
   a housing which supports the light source and the first and second optical elements, and includes a connection mechanism so as to be attached to an imaging apparatus.

8. A lighting apparatus comprising:
a light source which emits light with a predetermined light distribution in a fixed direction;
an optical element which is arranged in such a manner that at least part of the light emitted from the light source is input to the optical element, and can perform switching to a transmission state in which the light is transmitted, a first reflection state in which the light is reflected in a first direction, and a second reflection state in which the light is reflected in a second direction different from the first direction; and
a housing which supports the light source and the optical element, and includes a connection mechanism so as to be attached to an imaging apparatus.

* * * * *